(12) United States Patent
Stockstill et al.

(10) Patent No.: US 11,512,569 B2
(45) Date of Patent: Nov. 29, 2022

(54) POWER SYSTEM FOR OIL AND GAS FRACKING OPERATIONS

(71) Applicants: Wade Stockstill, Houston, TX (US); James French, Houston, TX (US); Jack Van Vleit, II, Houtson, TX (US); Tarik Gharrafi, Houston, TX (US)

(72) Inventors: Wade Stockstill, Houston, TX (US); James French, Houston, TX (US); Jack Van Vleit, II, Houtson, TX (US); Tarik Gharrafi, Houston, TX (US)

(73) Assignee: Amerimex Motor & Controls, LLC, Houston, TX (US)

( * ) Notice: Subject to any disclaimer, the term of this patent is extended or adjusted under 35 U.S.C. 154(b) by 179 days.

(21) Appl. No.: 16/852,127

(22) Filed: Apr. 17, 2020

(65) Prior Publication Data
US 2020/0340404 A1 Oct. 29, 2020

Related U.S. Application Data

(60) Provisional application No. 62/839,726, filed on Apr. 28, 2019.

(51) Int. Cl.
*F02C 7/20* (2006.01)
*E21B 43/26* (2006.01)
*F02C 7/32* (2006.01)
*F02C 7/18* (2006.01)

(52) U.S. Cl.
CPC ............ *E21B 43/2607* (2020.05); *F02C 7/18* (2013.01); *F02C 7/20* (2013.01); *F02C 7/32* (2013.01); *F05D 2220/76* (2013.01)

(58) Field of Classification Search
CPC ...... F02C 7/18; F02C 7/20; F02C 7/32; F05D 2220/76
See application file for complete search history.

(56) References Cited

U.S. PATENT DOCUMENTS 9,534,473 B2  1/2017  Morris et al.
10,246,984 B2  4/2019  Payne et al.
(Continued)

OTHER PUBLICATIONS

Glauser ("New legitimacy to concerns about fracking and health") (Year: 2014).*

(Continued)

*Primary Examiner* — Sean Gugger
(74) *Attorney, Agent, or Firm* — Keeling Law, LLC; Kenneth A. Keeling; Mark S. Solomon

(57) ABSTRACT

Embodiments of a power provision system of the present invention generally include a transformer, a drive assembly, a motor control center, rectifiers, circuit breakers, and a cooling system, all of which are enclosed in a cabinet that is divided into a plurality of compartments that house various components and that is adapted and configured to be skid mounted on a trailer. In one embodiment, high voltage power is supplied to the power provision system, wherein it is stepped down to lower voltages by the transformer and the lower voltage power is utilized to drive a fracking pump motor via the drive assembly, as well as auxiliary equipment, such as the cooling system, via the motor control center. Embodiments of a method of using the power provision system are also provided.

20 Claims, 14 Drawing Sheets

(56) References Cited

U.S. PATENT DOCUMENTS

| | | | | |
|---|---|---|---|---|
| 2005/0160740 A1* | 7/2005 | Nakano | ............... | F02C 7/12 |
| | | | | 60/801 |
| 2012/0269625 A1* | 10/2012 | Sabhapathy | ............ | F03D 80/80 |
| | | | | 416/1 |
| 2016/0369609 A1* | 12/2016 | Morris | ............... | E21B 43/26 |
| 2019/0063341 A1* | 2/2019 | Davis | ............... | F01D 15/10 |
| 2019/0154020 A1* | 5/2019 | Glass | ............... | F04B 17/03 |
| 2019/0207416 A1* | 7/2019 | Ellis | ............ | H02J 9/061 |

OTHER PUBLICATIONS

Wollin et al. ("Critical evaluation of human health risks due to hydraulic fracturing in natural gas and petroleum production") (Year: 2020).*

* cited by examiner

POWER SYSTEM FOR OIL AND GAS FRACKING OPERATIONS

CROSS-REFERENCE TO RELATED APPLICATIONS

This application claims the benefit of U.S. Provisional Application No. 62/839,726, filed on Apr. 28, 2019, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention generally relates to a power provision system. More particularly, embodiments of the present invention are directed to an apparatus and a method for providing electrical power to oil and gas fracking process equipment.

Background of the Invention

Hydraulic fracturing ("fracking") is a well stimulation method known in the art in which rock is fractured by a pressurized liquid. A general description of fracking is provided in "Hydraulic Fracturing or 'Fracking': A Short Summary of Current Knowledge and Potential Environmental Impacts," by Dr. David Healy, freely available online at https://www.epa.ie/pubs/reports/research/sss/UniAberdeen-_FrackingReport.pdf. Fracking is also generally described in U.S. Pat. No. 7,441,604 to Green and U.S. Pat. No. 8,875,790 to Baski. Each of these documents is incorporated herein by reference in their entirety.

Description of the Related Art

Fracking operations involve injecting a fluid into a formation from which oil and/or gas is to be extracted. Typically, the fluid is heated before being injected into the formation. Traditionally, the fracking fluids have been heated by conventional means such as burners that utilize propane gas, diesel fuel, or liquefied petroleum gas (LPG). These energy sources have limitations as are known in the industry.

BRIEF SUMMARY OF THE INVENTION

Embodiments of a power provision system of the present invention generally include a compartmentalized unit containing a transformer, a power conversion system, a cooling system, and a motor control center. Embodiments of a method of using embodiments of a power provision system of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

Figure 1:
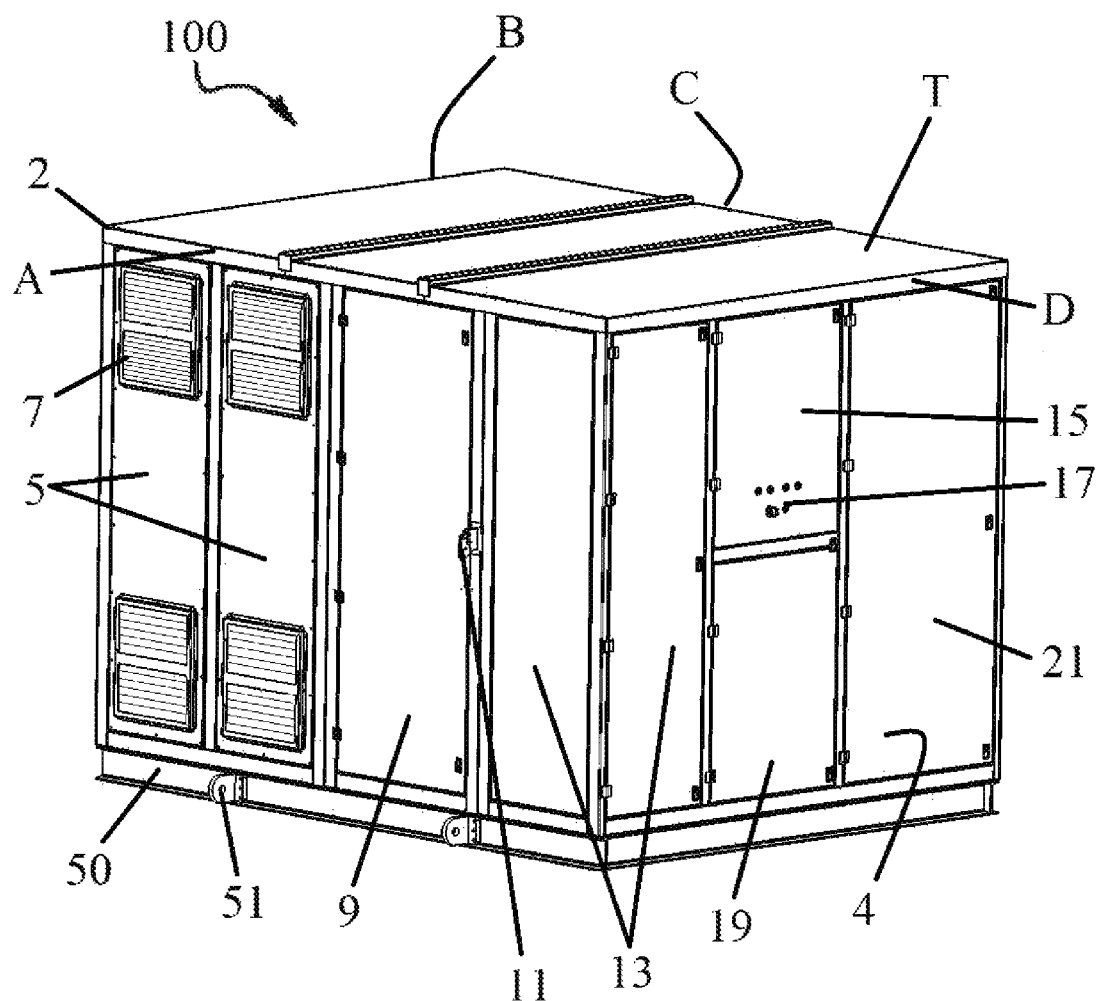
FIG. 1 is a perspective view of an embodiment of a power provision system of the present invention.

The exemplary embodiments are best understood by referring to the drawings, like numerals being used for like and corresponding parts of the various drawings. In the following description of embodiments, orientation indicators such as "top," "bottom," "up," "down," "upper," "lower," "front," "back," etc. are used for illustration purposes only; the invention, however, is not so limited, and other possible orientations are contemplated.

Referring first to FIG. 1, an embodiment of a power provision system 100 is depicted. In one embodiment, a power provision system 100 comprises an environmentally resistant cabinet 2 substantially enclosing various power generation and ancillary components as are described herein. In one embodiment, cabinet 2 comprises a plurality of panels ("skins") whose exterior surfaces make up an outer surface 4 of cabinet 2 and which protect various components from weather conditions and from exposure to physical or chemical contaminants. For simplicity, individual skins described herein are not separately labeled. In one embodiment, cabinet 2 comprises external receptacles (i.e., inputs/outputs accessible through openings in the skins) that allow for connection (e.g., electrical, fluid, fiber optic, etc.) of exterior components to one or more components contained there within. In one embodiment, cabinet 2 comprises access points (openings) through which gases may flow in/out of power provision system 100 and/or through which manual or connective access to internal components and/or internal receptacles may be effected. In one embodiment, one or more of such openings may comprise members (glands) that minimize the entry of external contaminants such as, but not limited to, dust and water. In one embodiment, power provision system 100 may comprise a plurality of interior compartments that segregate and isolate various components and/or systems from each other. In one embodiment, one or more of the various compartments may be operable under positive pressure wherein a gas, such as, but not limited to, air or nitrogen, may be provided by a gas pressurization device or source (not shown) to the compartment(s).

In one embodiment, cabinet 2 comprises dimensions such that power provision system 100 may be placed in or on locations which require specific size limitations, such as, but not limited to, the flat bed of an automotive trailer. In one embodiment, cabinet 2 comprises a width of less than or equal to 8.5 feet, a length of less than or equal to 11 feet, and a height of less than or equal to 8.5 feet, although other relative and absolute dimensions may be employed.

In FIG. 1, sides "A" and "D," as well as top "T" of an embodiment of a cabinet 2 are visible. Not visible in FIG. 1 are sides "B" and "C" of cabinet 2, which are visible in FIGS. 2 and 3, respectively. Looking first at side A in FIG. 1, a transformer compartment 5, which in this embodiment contains a plurality of vents (louvers) 7 in the skins covering it, houses one or more transformers 8 (see FIG. 4). Further visible regarding side A is a switch compartment 9, which houses a main switch 10 (see FIG. 4). In the embodiment of FIG. 1, an on/off handle 11 is positioned on or proximate the skin covering switch compartment 9. In one embodiment, on/off handle 11 may be actuated to engage or disengage main switch 10. A motor control center (MCC) compartment 13 (encompassed by portions of side A and side D) houses an MCC/lighting panel 6 (see FIG. 4). Referring further to side D, a low voltage compartment 15 houses various ancillary or optional components (not shown), such as, but not limited to, one or more ground fault systems and a battery system. In one embodiment, positioned in/on the skin covering low voltage compartment 15 is an emergency stop/drive control 17, as would be understood by one skilled in the art. Also visible with respect to side D, a drive assembly compartment 19 houses a drive assembly 12 (see FIG. 5). Still referring to side D, an inverter compartment 21 houses an inverter assembly 60 (see FIG. 5).

Figure 2:
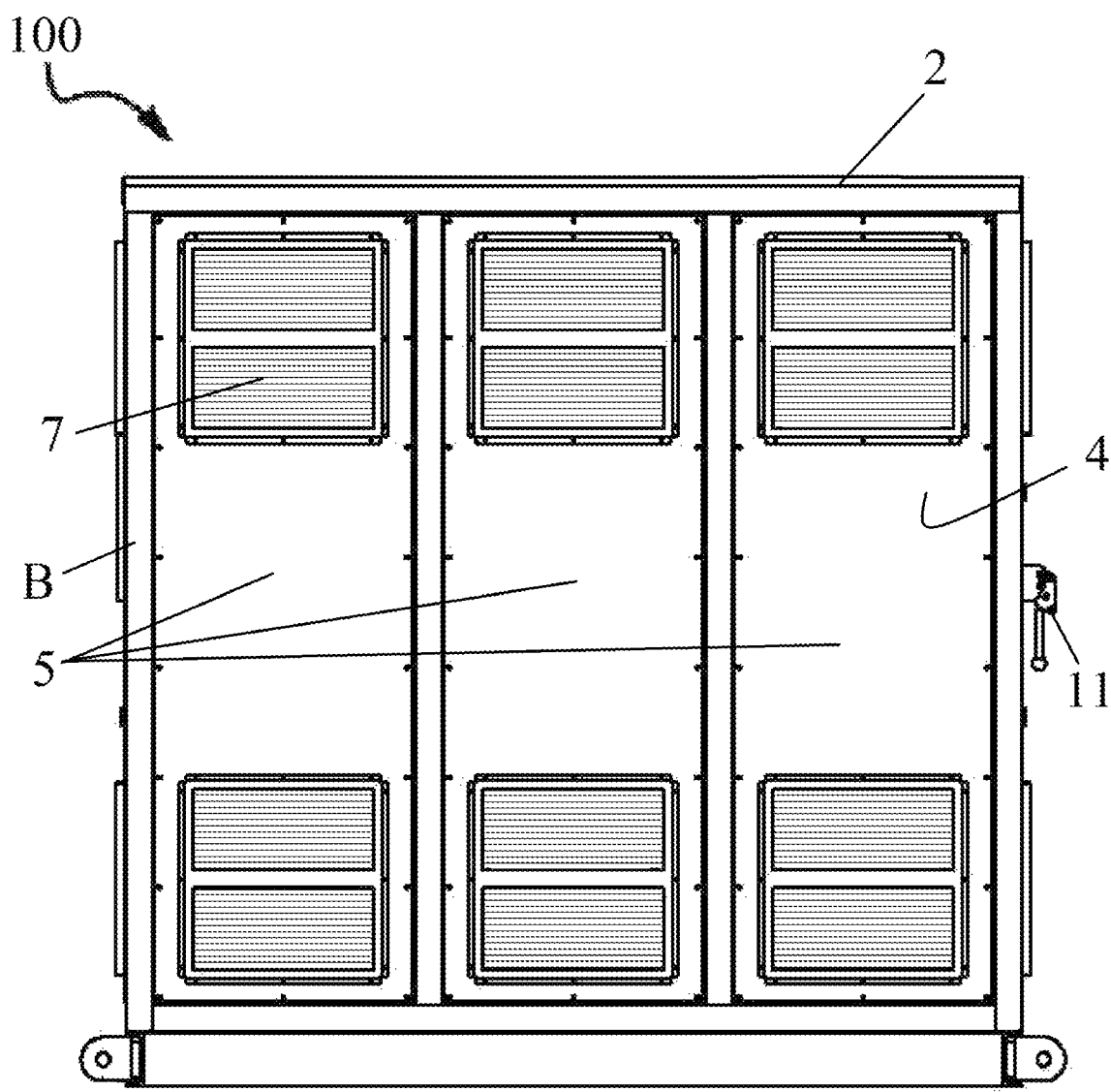
FIG. 2 is side view of an embodiment of a power provision system of the present invention.
Figure 3:
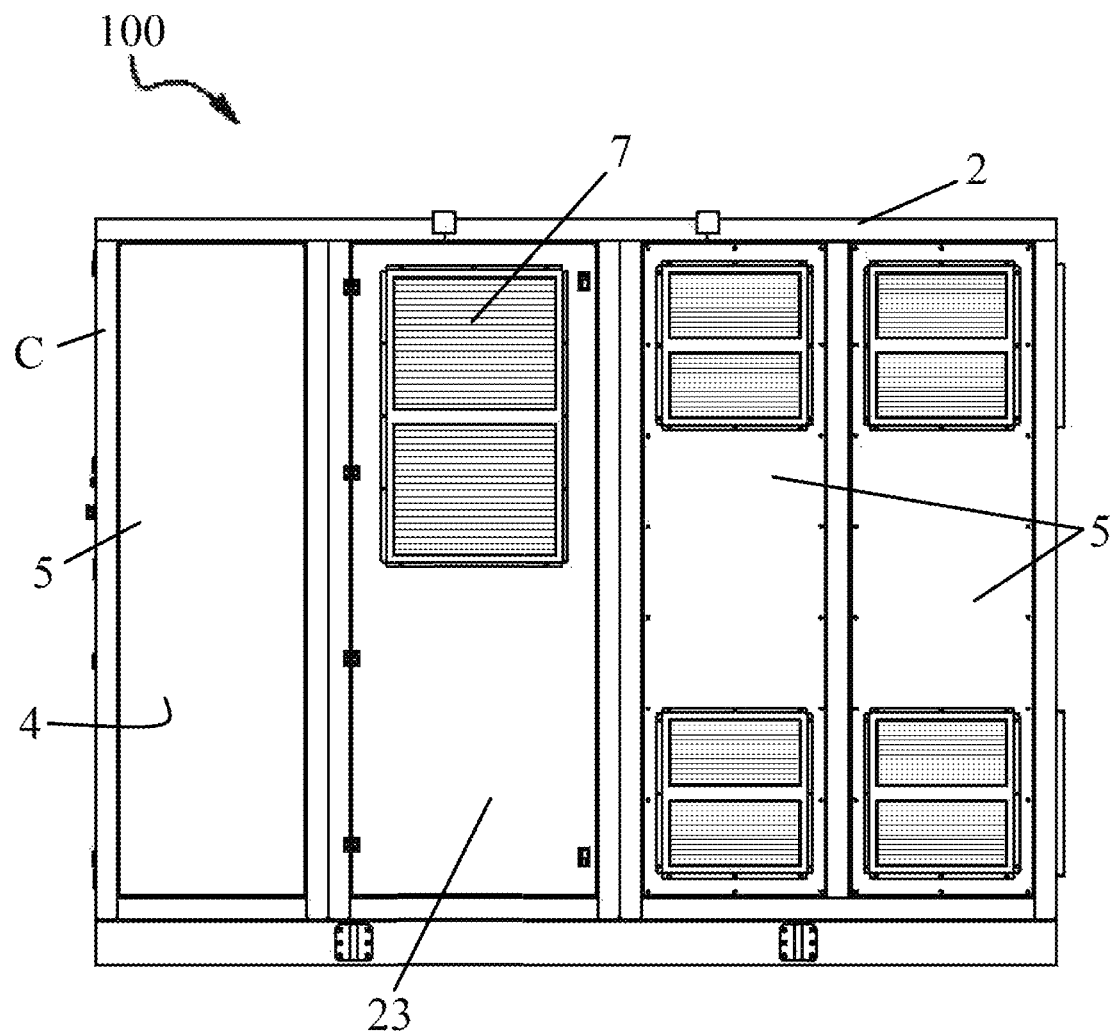
FIG. 3 is another side view of an embodiment of a power provision system of the present invention.
Figure 6:
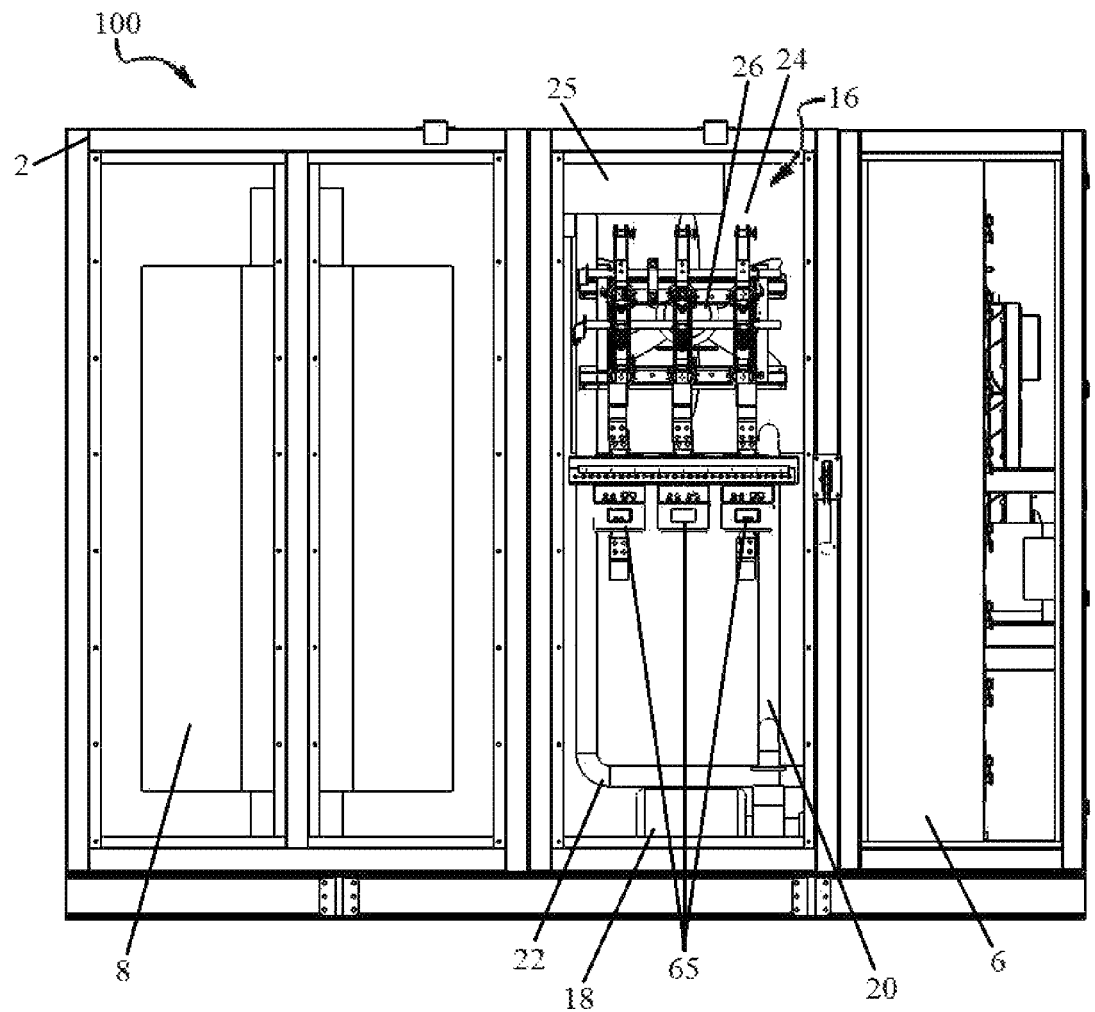
FIG. 6 is a side view of an embodiment of a power provision system of the present invention with the protective coverings removed.

Referring now to FIG. 2, an embodiment of side B of cabinet 2 is depicted. Therein, skins covering transformer compartment 5 are shown. In this embodiment, a plurality of vents 7 in cabinet 2 exterior surface 4 are employed. FIG. 3 depicts an embodiment of side C of cabinet 2. Therein, transformer compartment 5 and inverter compartment 21 are visible. In one embodiment, power provision system 100 cabinet 2 comprises a cooling system cabinet 23, which houses a cooling section 16 (see FIG. 6). In one embodiment, cooling system cabinet 23 comprises one or more vents 7.

In one embodiment, power provision system 100 may comprise one or more interactive components disposed at partially within an exterior surface 4 of cabinet 2. In one embodiment (not shown), motor control center (MCC) 6 is disposed at least partially within exterior surface 4 of cabinet 2. In one aspect, MCC 6, described in detail below, may generally be accessed from the exterior of power provision system 100 by at least partially removing the skin covering MCC compartment 13. In one embodiment, MCC 6 comprises one or more starters (not separately labeled) and/or one or more feeders (not separately labeled). In one embodiment, feeders comprise size 1 and/or size 2 feeders. In one embodiment, starters comprise 30 amp and/or 60 amp feeders.

Figure 4:
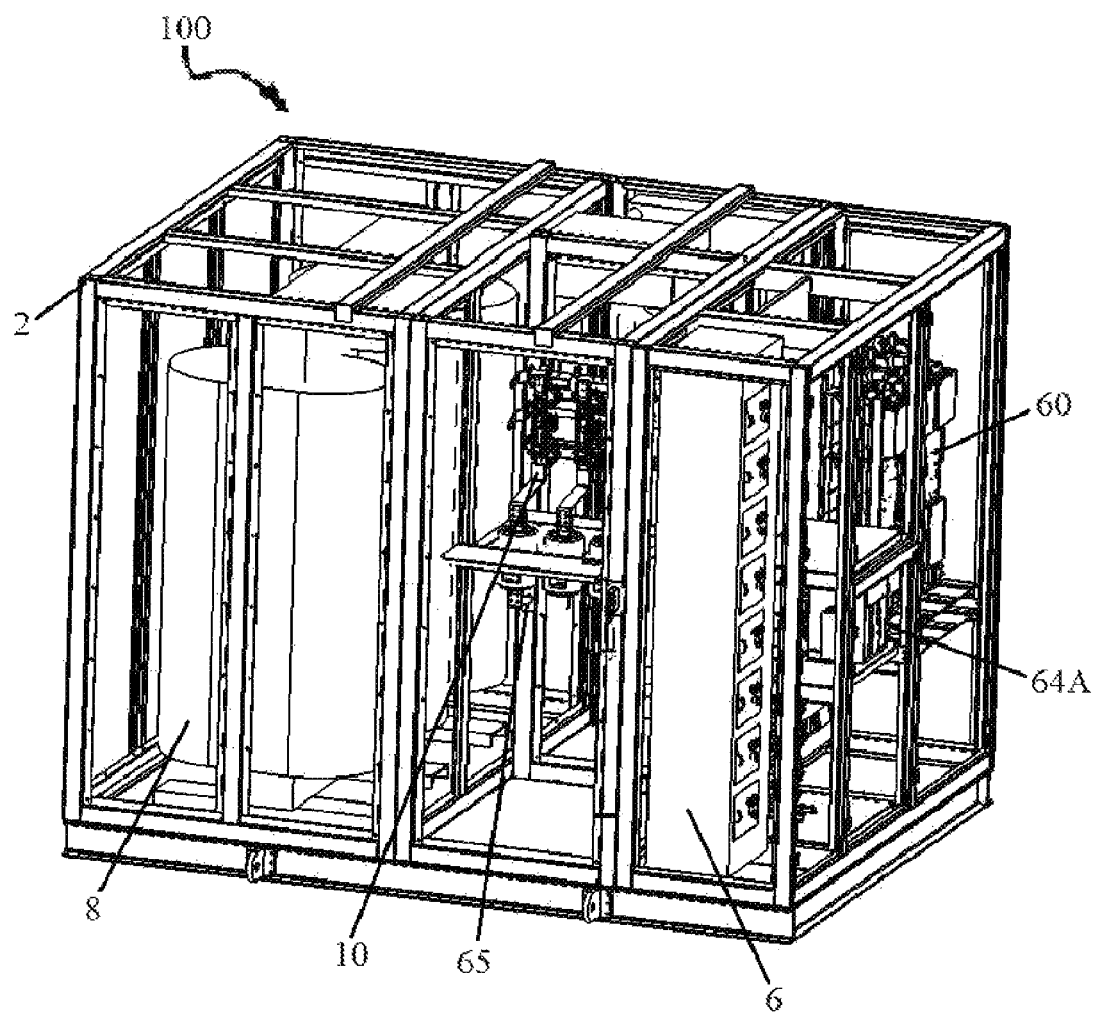
FIG. 4 is a perspective view of an embodiment of a power provision system of the present invention with the protective coverings removed.

Referring now to FIG. 4, one view of an embodiment of a power provision system 100 without cabinet 2 skins is displayed. In one embodiment, power provision system 100 comprises one or more transformers 8. In one embodiment, power provision system 100 is adapted and configured to handle a 13.8 kV electrical feed to transformer 8, although the invention is not so limited and other electrical power input levels may be employed. In one embodiment, a transformer 8 comprises one or more taps (not shown) and encompasses voltages specific to a particular application, as would be understood by one skilled in the art. In one embodiment, transformer 8 is a 3,500 kVA power distribution transformer. In one embodiment, transformer 8 is copper or aluminum wound, although the invention is not so limited and other windings may be employed. In one embodiment, a transformer 8 may comprise a 24, 18, 12 or 6 pulse configurable primary winding (not shown). In one embodiment, a transformer 8 secondary winding (not shown) provides multiple lower voltages, including options for single-phase hotel and auxiliary loads, as would be understood by one skilled in the art. In one embodiment, transformer 8 is adapted and configured to step down power to provide voltages lower than electrical power supplied to power provision system 100 to various components thereof. In other embodiments (not shown), a transformer 8 may be adapted and configured to step up power to provide voltages higher than electrical power supplied to power provision system 100 to various components thereof. In one embodiment, a transformer 8 may provide main power conversion to 720V, 690V, 600V (or other suitable voltage) for drive assembly 12, to 480V for motor control center 6, and to 120V for control and other hotel loads, although the invention is not so limited and other desired voltages may be produced and utilized. In one embodiment, circuit breakers 64 (see FIG. 5) may be provided to isolate the different voltages provided by the transformer 8. In one embodiment (not shown), each secondary (stepped-up and/or stepped-down) power employs a ground fault monitoring system. In one embodiment (not shown) transformer compartment 5 may be positively pressurized (e.g., air or nitrogen) to minimized dust incursion and explosion and/or fire occurrence.

In one embodiment, power provision system 100 comprises a main load interrupting switch (not shown) that may be utilized for isolating transformer 8 from a power supply (not shown). In one embodiment, such a switch may comprise a medium voltage switch for incoming power isolation. In one embodiment, such a switch comprises a mechanically operated 600 amp frame unit rated for 15 kV and fuse protected for 200 amps.

Figure 5:
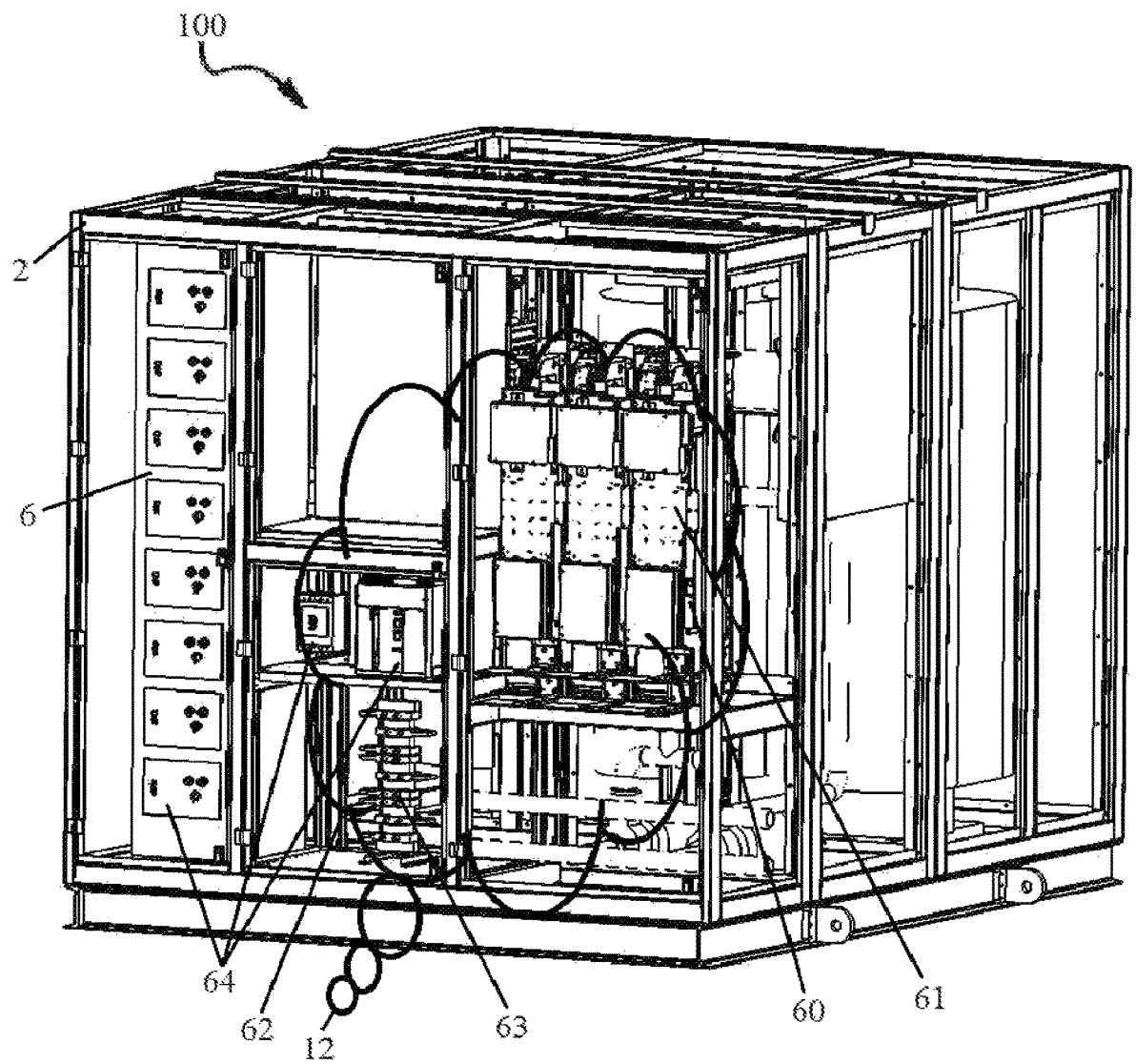
FIG. 5 is another perspective view of an embodiment of a power provision system of the present invention with the protective coverings removed.

In one embodiment, power provision system 100 comprises a power conversion (drive) assembly 12 comprising a motorized long, short, instantaneous trip unit (LSI) switch/breaker 64A, one or more rectifier assemblies 62, and one or more inverter assemblies 60 (see FIG. 5). In one embodiment, the drive assembly 12 is utilized to provide a desired electrical power supply to drive a main fracking process motor 54 (see FIGS. 13A and 13B). In one embodiment, the drive assembly 12 is a variable frequency drive (VFD) power converter. In one embodiment, the drive assembly comprises a 3,000 horsepower (HP) VFD power converter. In one embodiment, the drive assembly may be positioned within a cabinet 2 enclosure (not shown) having an IP66 International/Ingress Protection (IP) Rating. In one embodiment, the drive assembly may be liquid cooled. In one embodiment, such drive assembly liquid cooling may comprise one or more heat exchangers (not shown) at least partially disposed within the enclosure(s) housing the drive assembly 12. In one aspect, such heat exchanger(s) provide a means for cooling the air within the drive assembly enclosure (not shown), thereby eliminating the need for an external air conditioner.

In one embodiment, switch/breakers 64 are electrically connected to, and receive (stepped up or stepped down) AC electrical power from, transformer 8. In one embodiment, a switch/breaker 64A is a 2,500 amp switch equipped with an undervoltage trip coil. In one embodiment, switch/breaker 64A receives 690V electrical power from transformer 8, although any useful voltage electrical power may be provided to a switch/breaker 64. In one embodiment, switch/breaker 64A may be protected by one or more fuses 65 (see FIG. 6). In one embodiment, a switch/breaker 64B is a 400 amp switch which receives 480V electrical power from transformer 8. In one embodiment, rectifier assembly 62 comprises a 4,000 amp rectifier assembly. In one embodiment, rectifier assembly 62 comprises one or more rectifiers 63. In the embodiment of FIG. 5, rectifier assembly 62 comprises three rectifiers 63. In one embodiment, rectifiers 63 are electronically connected to, and receive AC electrical power from, switch/breaker 64A. In one aspect, rectifiers 63 convert the input AC electrical power to DC electrical power. In one embodiment, inverter assembly 60 comprises one or more inverters 61. In one embodiment, inverter assembly 60 comprises three inverter assemblies 60. In one embodiment, at least one inverter assembly 60 comprises an 800 amp inverter assembly. In one embodiment, inverters 61 are electronically connected to, and receive DC electrical power from rectifiers 63. In one aspect, inverters 61 convert the input DC electrical power to AC electrical power. In one embodiment, inverters 61 are electronically connected to and transmit AC electrical power to motor 54 (shown in FIGS. 13A and 13B).

In one embodiment, power provision system 100 comprises an MCC 6 that provides distributed, controlled electrical power to various auxiliary motors or devices (not shown), as would be understood by one skilled in the art. In one embodiment, MCC 6 is electrically connected to, and receives (stepped up or stepped down) AC electrical power from, transformer 8. In one embodiment, MCC 6 receives 480V electrical power from transformer 8. In one embodiment, MCC 6 is contained within an enclosure having an IP66 rating, whereby the power provision system 100 is suitable for outdoor use. In one embodiment, MCC 6 comprises a lighting panel (not separately labeled) that receives lower voltage electrical power, such as, but not limited to 208/120V electrical power, from transformer 8. In one embodiment, MCC 6 comprises one or more starters (not shown) that distribute electrical power to various components. In one embodiment, MCC 6 provides electrical power to cooling section 16 (described below). In one embodiment, MCC 6 provides electrical power to independently operated blowers (not shown) that provide cooling air for the pump motor 54. In one embodiment, MCC 6 provides electrical power to a lubrication oil pump (not shown) for a pump 56 lubricating system (not shown). In one embodiment, MCC 6 comprises at least one spare breaker to provide auxiliary power to ancillary equipment (not shown).

Figure 7:
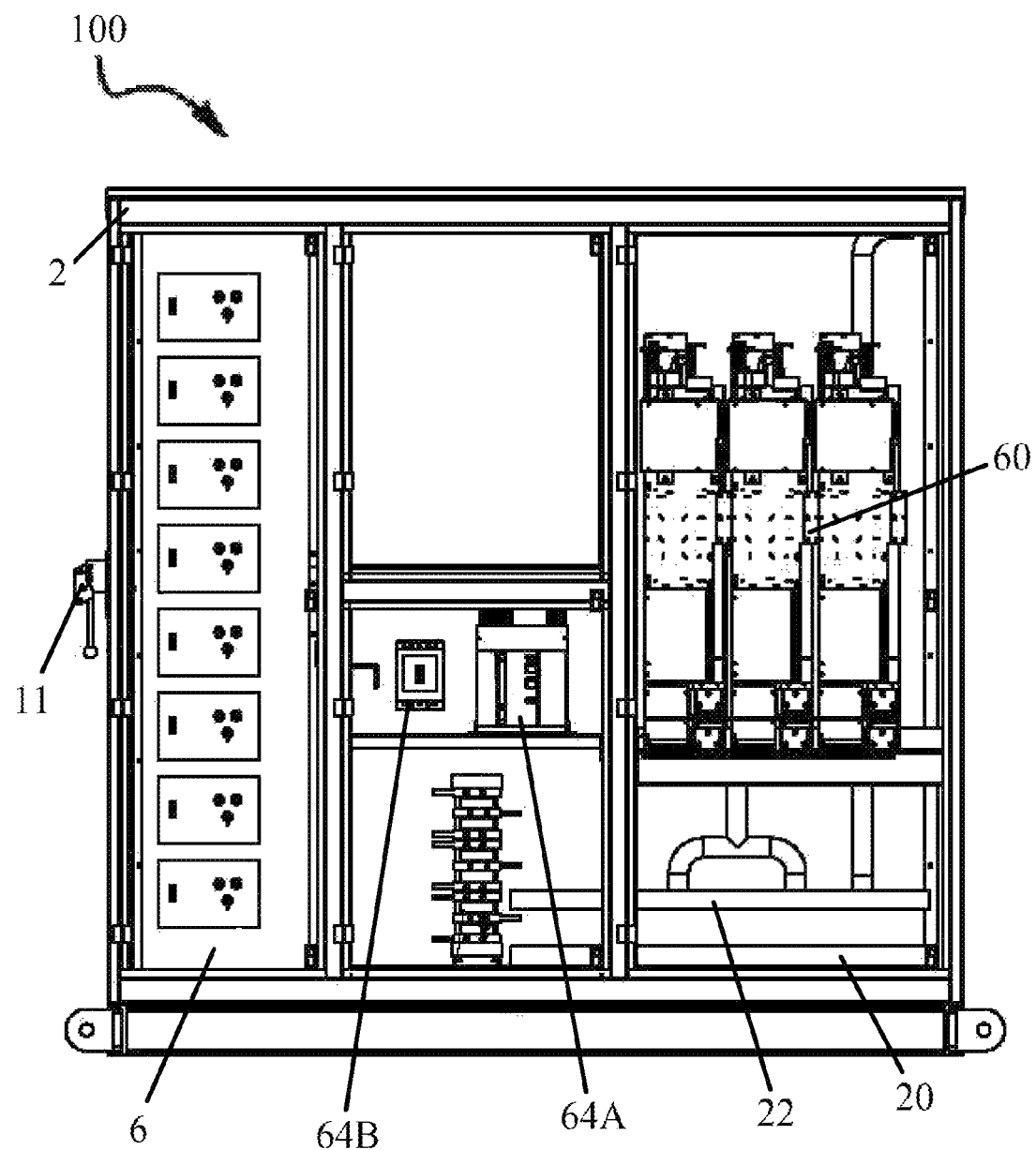
FIG. 7 is another side view of an embodiment of a power provision system of the present invention with the protective coverings removed.
Figure 8:
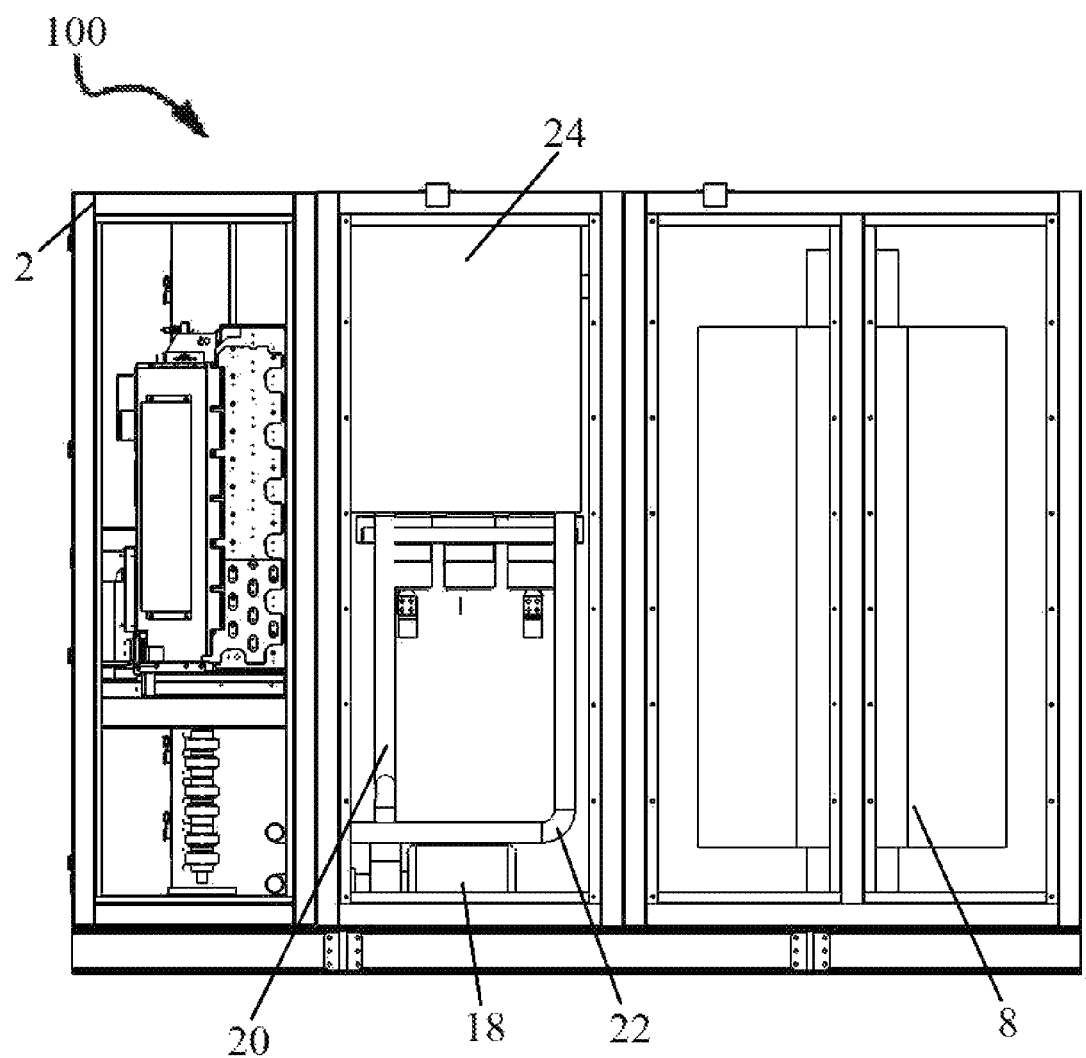
FIG. 8 is another side view of an embodiment of a power provision system of the present invention with the protective coverings removed.
Figure 9:
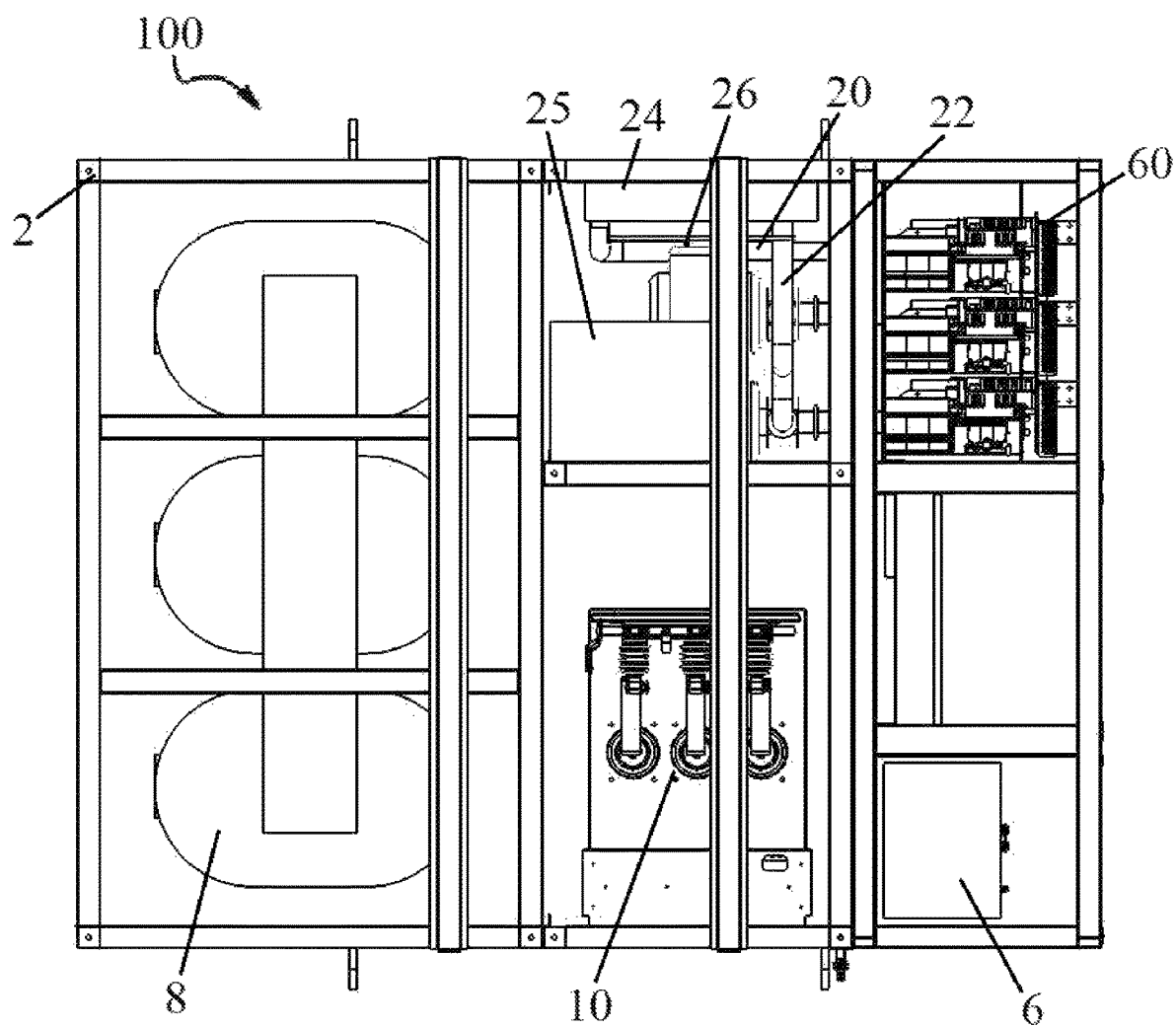
FIGS. 9, 10, 11 and 12 are cross-sectional views of an embodiment of a power provision system of the present invention.
Figure 10:
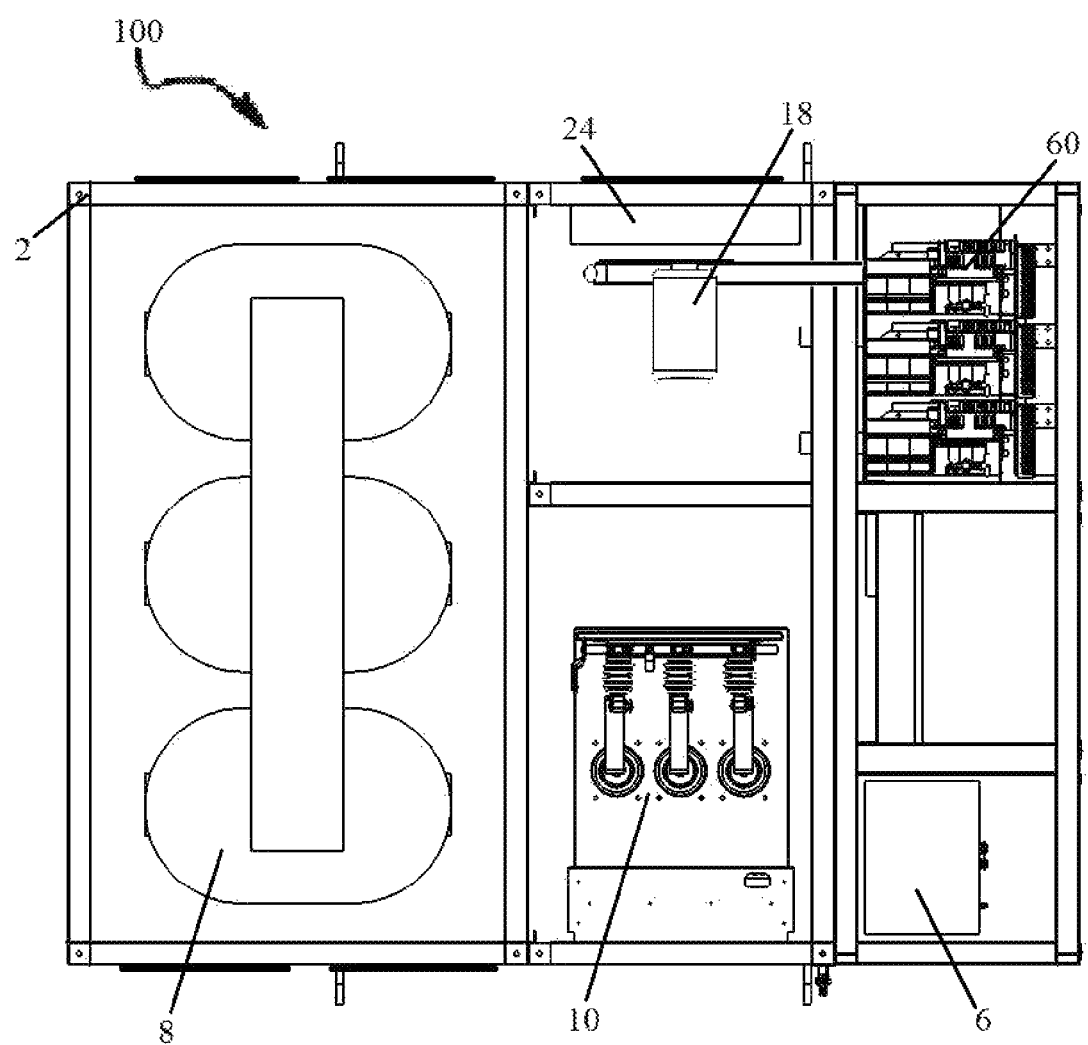

In one embodiment, power provision system 100 comprises a cooling section 16 that may be utilized to dissipate heat produced during operation of power provision system 100. As depicted in more detail in FIGS. 6, 7 and 8, in one embodiment a cooling section 16 comprises one or more cooling pumps 18, a fluid supply manifold 20, a fluid return manifold 22, one or more cooling fans 26, one or more radiators 24, and a coolant reservoir 25. In one embodiment, cooling system 16 comprises a controller (not shown) that is operated to control the various components thereof. In one embodiment, a cooling pump 18 comprises an electric motor operated liquid recirculating pump that allows for distribution of cooling liquid (not shown) to various power provision system 100 components. In one embodiment, a fan 26 may be employed to blow air across radiator(s) 24 to dissipate heat from cooling section 16 by expelling the blown air from power provision system 100, thereby cooling the cooling liquid for recirculation.

In various embodiments, cooling section 16 may be utilized to provide heat dissipation from power provision system 100 via additional radiators (not shown) employed within various interior compartments of power provision system 100. In one embodiment, cooling section 16 may be utilized to flow cooled liquid through drive systems, reactors, and rectifiers within power provision system 100, as would be understood by one skilled in the art. In one embodiment, cooling pump 18 and radiator 24 may be sized large enough to accommodate auxiliary oil coolers (not shown) and the prime mover or driven equipment cooling fans (not shown) as well allowing for the main electric drive motor (not shown) to have its Ingress Protection Marking rating increased.

Referring now to FIGS. 9, 10, 11 and 12, various cross-sectional views of an embodiment of power provision system 100 at different orientations and elevations are depicted. Therein, various components of power provision system 100 can be seen from different angles.

In one embodiment (not shown), contained within the surface 4 of cabinet 2 is a human-machine interface (HMI), which may comprise any type of useful interactive mechanism, such as, but not limited to membrane switches, rubber keypads and/or touchscreens, whereby an operator can input instructions to the power provision system 100, view and/or access information therefrom, perform diagnostics, and/or perform other desired functions respecting the power provision system 100.

Figure 13A:
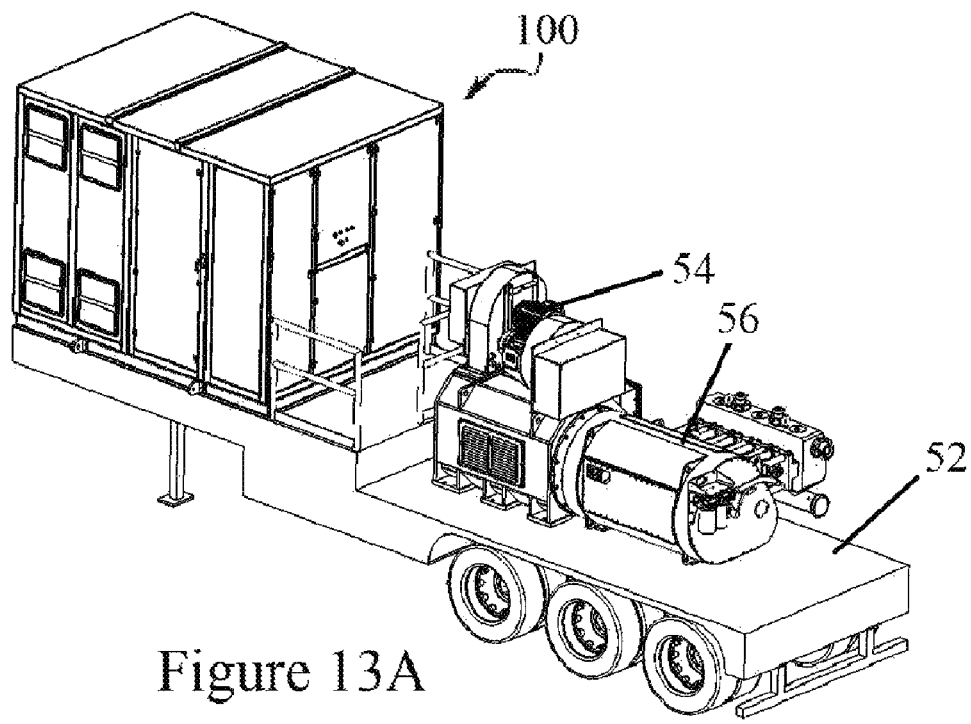
FIGS. 13A and 13B are perspective views of an embodiment of a power provision system of the present invention mounted on a skid as part of a mobile system.
Figure 13B:
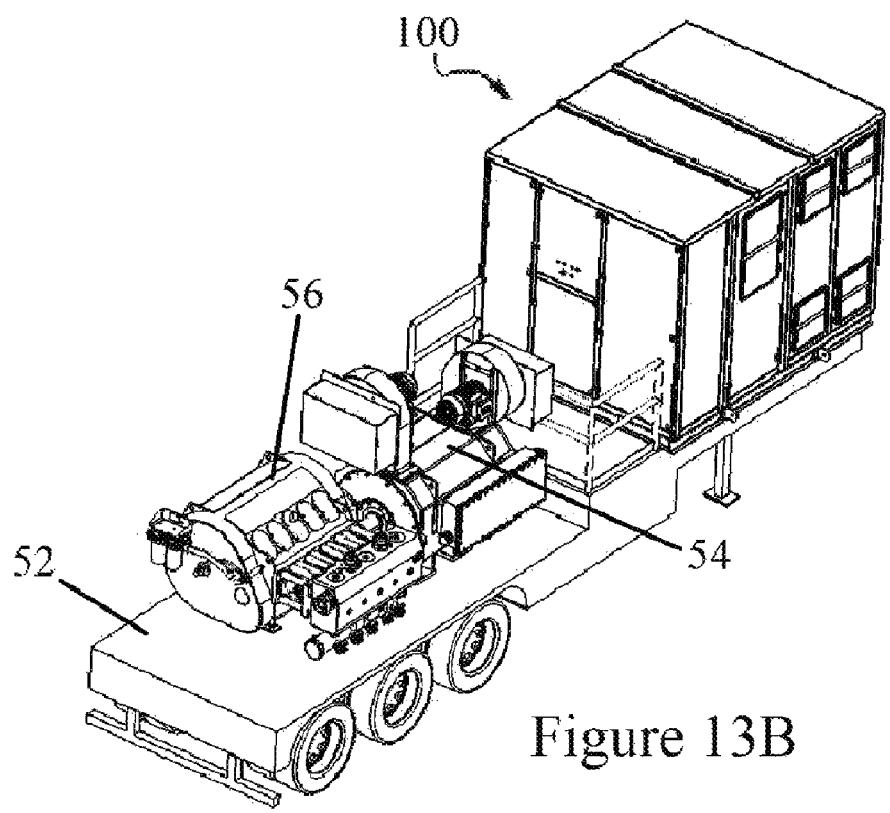

FIGS. 13A and 13B depict opposite perspective views of an embodiment of a skid-mounted power provision system 100. In the embodiment of FIGS. 13A and 13B, a power provision system 100 is positioned on a skid 50 (see FIG. 1), as would be understood by one skilled in the art. In one embodiment, attached to or integral with the skid 50 is a means for transporting the power provision system 100 to a desired site location. In one embodiment, such means comprises a plurality of padeyes 51 (see FIG. 1). In the embodiment of FIGS. 13A and 13B, skid 50 is positioned on a trailer 52 that can be attached to a truck (not shown) and towed to the desired site location.

In one embodiment, additionally positioned on trailer 52 are a motor 54 and a pump 56, which may be useful in conducting a fracking operation. In one aspect, motor 54 is powered by power provision system 100, whereby motor 54 drives pump 56 to provide a pressurized fracking liquid, as would be understood by one skilled in the art. In one embodiment, motor 54 comprises a 2,850 HP motor, although the invention is not so limited and other size/power motors 54 may be employed. In one embodiment, pump 56 comprises a 3,000 HP pump, although the invention is not so limited and other size/power pumps 56 may be employed. In other embodiments (not shown), a plurality of motors 54 and/or pumps 56 may be utilized.

Figure 11:
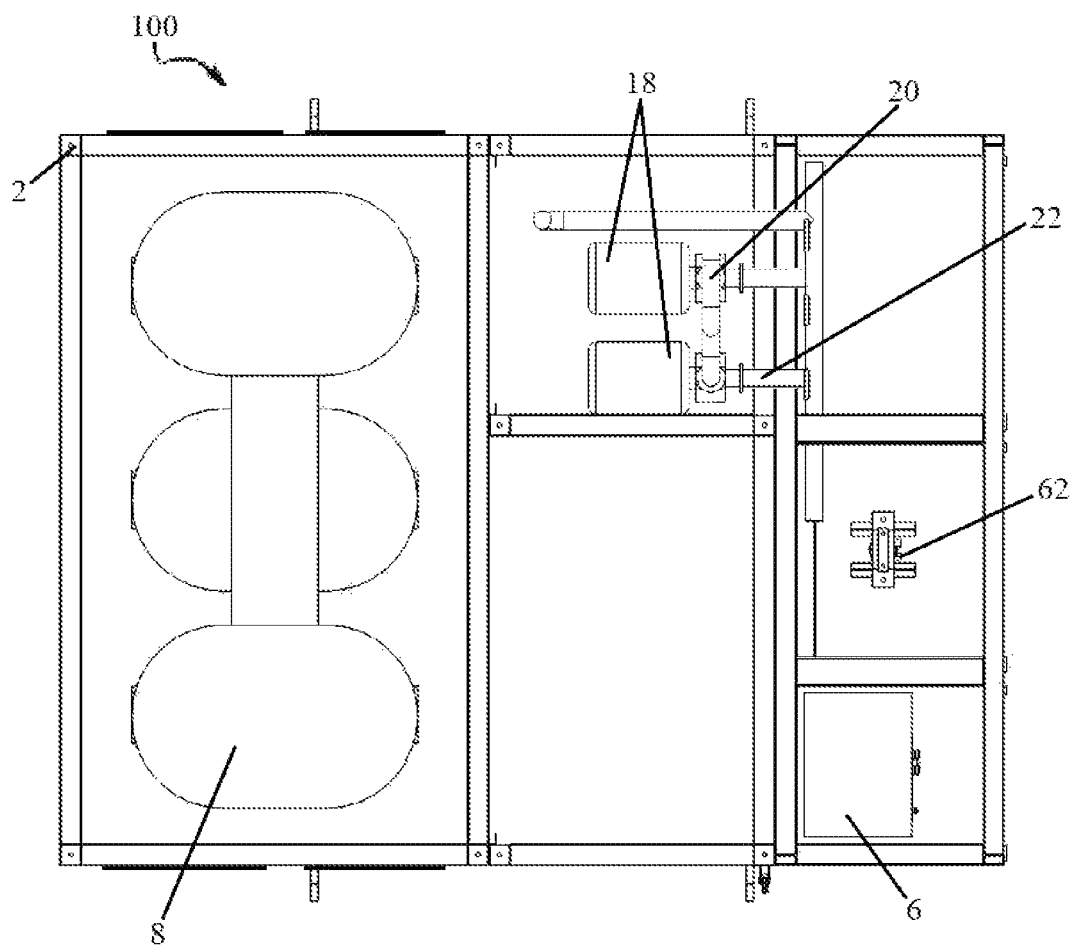
Figure 12:
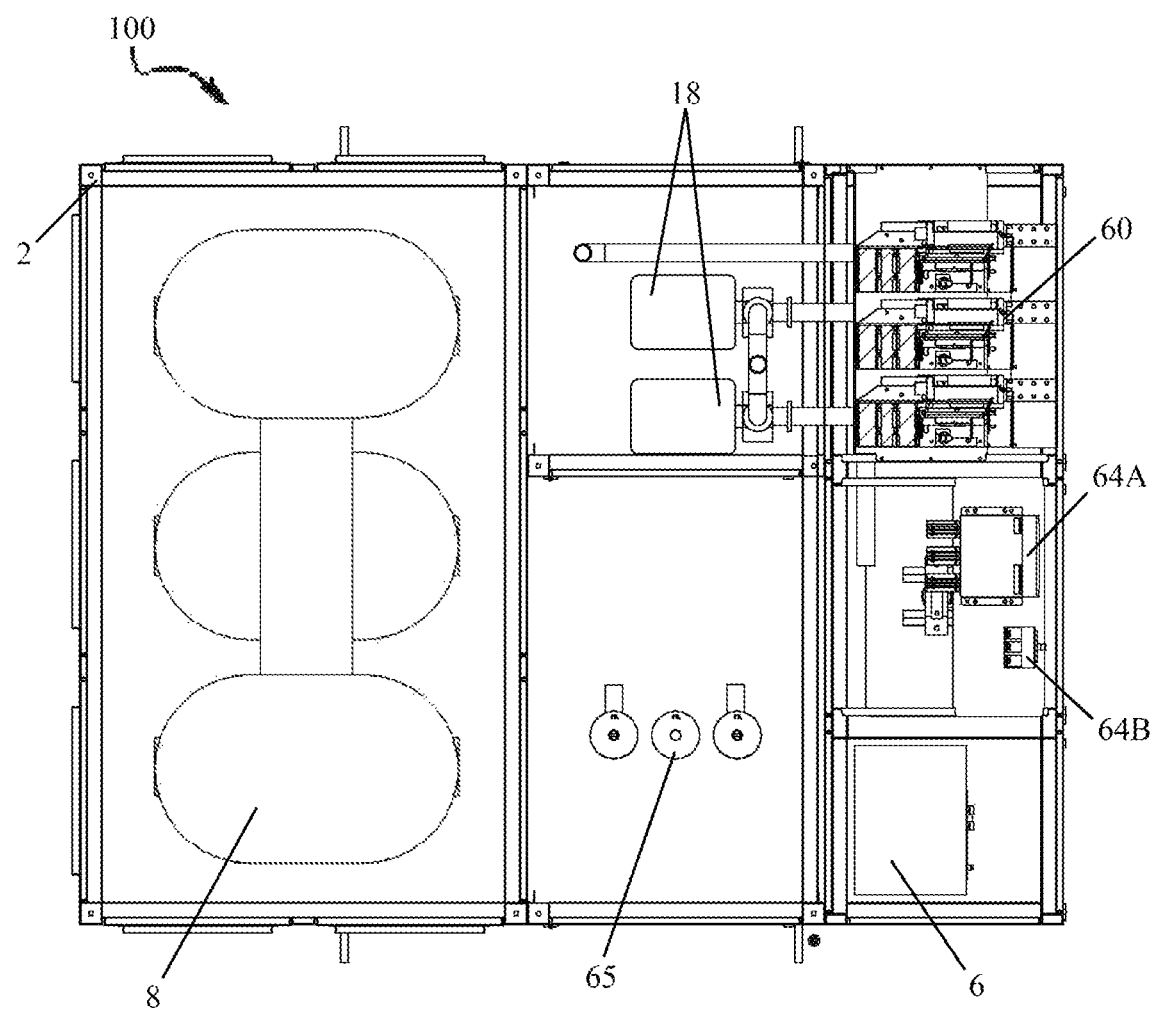
Figure 14:
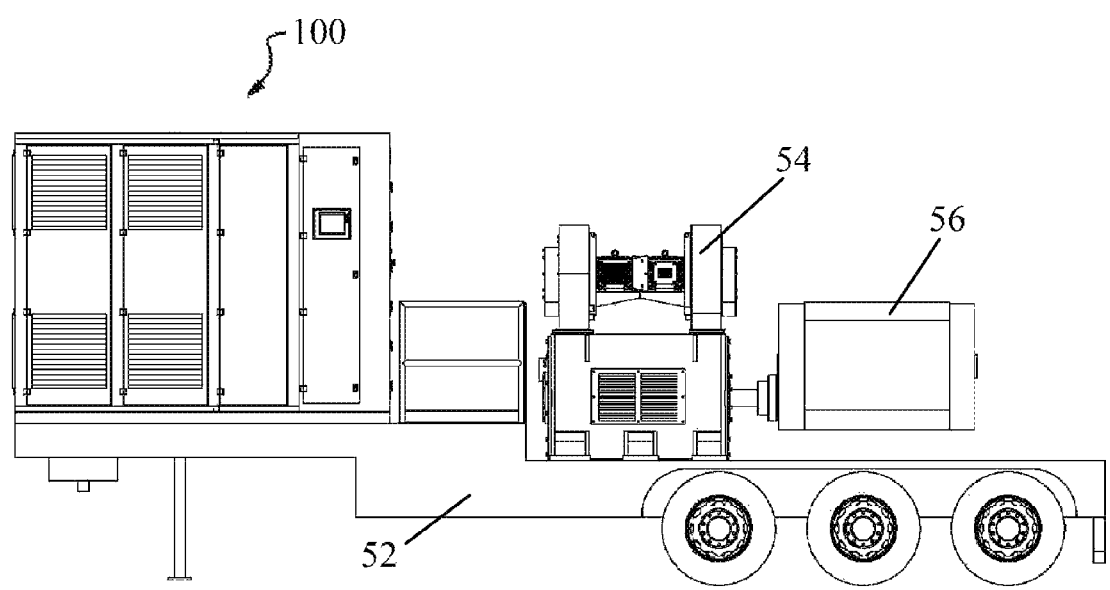
FIG. 14 is a side view of an embodiment of a power provision system of the present invention mounted on a skid as part of a mobile system.

FIG. 14 shows a side view of an embodiment of a power provision system 100, along with a motor 54 and a pump 56, positioned on a trailer 52. Although a particular orientation of power provision system 100 is depicted in FIG. 11, other orientations thereof are contemplated.

Operation

Generally, a power provision system 100 is utilized to provide power to a fracking operation. In one embodiment, a power provision system 100 is provided in a desired location, such as by transporting it on a trailer-mounted skid as shown in FIGS. 10A and 10B. Once the power provision system 100 is in place, it is electrically connected to a high voltage power supply. In one embodiment, the electrical power provided to the power provision system 100 comprises 13.8 kV electrical power. The transformer 8 receives the high voltage electrical power and steps down the power to one or more lower voltages. In one embodiment, the lower voltages comprise 690 kV or 600 kV power, 480 kV power, and 208/120 kV power.

In one embodiment, the 690 (or 600)V power is transmitted from transformer 8 to the motorized LSI switch/breaker 10 of drive assembly 12. In one embodiment, AC electrical power is transmitted from the LSI switch/breaker 10 to the rectifier assembly 62 wherein a rectifier(s) 63 converts the AC electrical power to DC electrical power. In one embodiment, the DC electrical power is then transmitted from the rectifier(s) 63 to inverter assembly 60, wherein an inverter(s) 61 converts the DC electrical power back to AC electrical power. AC electrical power can then be transmitted (at a desired frequency) to motor 54 which in turn drives fracking pump 56 to supply pressurized fluid downhole.

In addition, in one embodiment, the 480V power is transmitted from transformer 8 to MCC 6. In one embodiment, 480V electrical power is provided via MCC 6 to drive the components of cooling section 16, such as, but not limited to, cooling pump 18 and cooling fan(s) 26. In one aspect, cooling section 16 is utilized to dissipate heat from the various components and/or compartments of power provision system 100.

In addition, in one embodiment, the 208/120V power is transmitted from transformer 8 to the lighting panel (not separately labeled). In one embodiment, the lower voltage power provided to lighting panel may be used to drive auxiliary equipment and/or accommodate hotel loads.

Method

An exemplary method of utilizing an embodiment of a system 100 of the present invention comprises:

A Power Provision System Provision Step, comprising provide a power provision system, such as power provision system 100, proximate a motor to be driven, such as motor 54;

A Power Provision Step, comprising inputting high voltage electrical power to the power provision system;

A First Power Step-Down and Transmission Step, comprising utilizing a transformer, such as transformer 8, to step down or step up the input electrical power to a desired first voltage and transmitting the first voltage to a drive assembly, such as drive assembly 12, wherein a desired frequency and voltage power is transmitted to the motor;

A Second Power Step-Down and Transmission Step, comprising utilizing a transformer, such as transformer 8, to step down or step up the input electrical power to a desired second voltage and transmitting the first voltage to an MCC, such as MCC 6, wherein the second voltage is transmitted to a cooling section, such as cooling section 16, wherein various components of the power provision system can be cooled;

A Third Power Step-Down and Transmission Step, comprising utilizing a transformer, such as transformer 8, to step down or step up the input electrical power to a desired third voltage and transmitting the third voltage to a lighting panel, wherein various components of and ancillary to the power provision system can be driven.

The foregoing method is merely exemplary, and additional embodiments of a method of utilizing a power provision system of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

We claim:
1. A power provision system comprising:
a cabinet;
one or more transformers;
a drive assembly;
a motor control center;
a lighting panel; and
a cooling system;
wherein:
said cabinet houses said one or more transformers, said drive assembly, said motor control center, said lighting panel and said cooling system;
said drive assembly is positioned within an enclosure within said cabinet
at least a portion of said cooling system operates to cool the air within said enclosure;
at least one said transformer accepts electrical power comprising an input voltage and steps down and/or steps up said input voltage to provide electrical power at desired voltages to said drive assembly, said motor control center, and said lighting panel;
said drive assembly utilizes said electrical power supplied thereto to provide electrical power to a motor;
said motor control center utilizes said electrical power supplied thereto to provide electrical power to said cooling system;
said lighting panel is adapted and configured to utilize said electrical power supplied thereto to provide electrical power to one or more auxiliary and/or ancillary devices;
and said cabinet is sized to be positioned on a trailer.

2. The power provision system of claim 1, wherein said cabinet comprises a plurality of interior compartments that segregate and isolate various components and/or systems from each other.

3. The power provision system of claim 2, wherein at least one said interior compartment is operable under positive pressure effected by a gas supplied thereto.

4. The power provision system of claim 1, wherein said motor control center comprising one or more starters and/or one or more feeders is disposed at least partially within an exterior surface of said cabinet.

5. The power provision system of claim 1, wherein said drive assembly comprises a motorized long, short, instantaneous trip unit switch/breaker, one or more rectifier assemblies, and one or more inverter assemblies.

6. The power provision system of claim 1, wherein said drive assembly comprises a variable frequency drive power converter.

7. The power provision system of claim 1, wherein said cooling system utilizes liquid cooling to cool said air within said enclosure.

8. The power provision system of claim 1, wherein said enclosure has an IP66 rating.

9. A method of utilizing a power provision system, comprising:
providing the power provision system of claim 1 proximate an external motor;
providing an input electrical power to said power provision system;
wherein:
at least one said transformer steps down or steps up said input electrical power to a desired first voltage electrical power and transmits said first voltage electrical power to said drive assembly;
at least one said transformer steps down or steps up said input electrical power to a desired second voltage electrical power and transmits said second voltage electrical power to said motor control center;
at least one said transformer steps down or steps up said input electrical power to a desired third voltage electrical power and transmits said third voltage electrical power to said lighting panel; and
operating said power provision system to operate said external motor;
wherein:
said first voltage electrical power is transmitted from said drive assembly to said external motor;
said second voltage electrical power is transmitted from said motor control center to said cooling system; and
said lighting panel is adapted and configured to transmit said third voltage electrical power to one or more auxiliary and/or ancillary devices.

10. The method of utilizing the power provision system of claim 9, wherein said power provision system is positioned on a trailer.

11. The method of utilizing the power provision system of claim 9, wherein said external motor is a fracking process motor used to supply pressurized fluid in a downhole fracking operation.

12. The method of utilizing a power provision system of claim 9, wherein said cooling system utilizes liquid cooling to cool said air within said enclosure.

13. The method of utilizing a power provision system of claim 9, wherein said enclosure housing said drive assembly has an IP66 rating.

14. The method of utilizing a power provision system of claim 9, wherein:
said cabinet comprises a plurality of interior compartments that segregate and isolate various components and/or systems from each other; and
at least one said interior compartment is operable under positive pressure effected by a gas supplied thereto.

15. A power provision system comprising:
a cabinet;
one or more transformers;
a drive assembly;
a motor control center
a lighting panel;
a cooling system; and
one or more auxiliary and/or ancillary devices;
wherein:
said cabinet houses said one or more transformers, said drive assembly, said motor control center, said lighting panel and said cooling system;
said cabinet comprises a plurality of interior compartments that segregate and isolate various components and/or systems from each other;
said drive assembly is positioned within one said interior compartment
said cooling system cools air within said interior compartment housing said drive assembly;
at least one said transformer accepts electrical power comprising an input voltage and steps down and/or steps up said input voltage to provide electrical power at desired voltages to said desired drive assembly, said motor control center, and said lighting panel;
said drive assembly utilizes said electrical power supplied thereto to provide electrical power to a motor;
said drive assembly comprises a motorized long, short, instantaneous trip unit switch/breaker, one or more rectifier assemblies, and one or more inverter assemblies;
said drive assembly comprises a variable frequency drive power converter;
said motor control center utilizes said electrical power supplied thereto to provide electrical power to said cooling system;
said motor control center comprises one or more starters and/or one or more feeders, and is disposed at least partially within an exterior surface of said cabinet;
said lighting panel utilizes said electrical power supplied thereto to provide electrical power to at least one of said one or more auxiliary and/or ancillary devices;
said cooling system comprises:
one or more cooling pumps;
a fluid supply manifold;
a fluid return manifold;
one or more cooling fans;
one or more radiators; and
a coolant reservoir; and
said cabinet is sized to be positioned on a trailer.

16. The power provision system of claim 15, wherein said cooling system cools air within said interior compartment housing said drive assembly utilizing a cooling liquid.

17. The power provision system of claim 15, wherein at least one said interior compartment is operable under positive pressure effected by a gas supplied thereto.

18. The power provision system of claim 16, wherein:
said cooling system comprises at least one heat exchanger.

19. The power provision system of claim 16, wherein said interior compartment housing said drive assembly has an IP66 rating.

20. The power provision system of claim 15, wherein said motor control center is contained within a compartment having an IP66 rating.

* * * * *